United States Patent [19]

Bonorand

[11] 4,192,085

[45] Mar. 11, 1980

[54] TEACHING AID DEVICE FOR TEACHING THE BASIC PRINCIPLES OF ARITHMETIC

[75] Inventor: Simon Bonorand, Zuoz, Switzerland

[73] Assignee: Guido Caviezel, Chur, Switzerland

[21] Appl. No.: 879,245

[22] Filed: Feb. 21, 1978

[30] Foreign Application Priority Data

Feb. 25, 1977 [CH] Switzerland ............... 2436/77

[51] Int. Cl.² ............................................. G09B 19/02
[52] U.S. Cl. ............................................. 35/31 E
[58] Field of Search ............ 35/31 R, 31 C, 31 E, 35/32, 33, 75

[56] References Cited

U.S. PATENT DOCUMENTS

| | | | |
|---|---|---|---|
| 973,905 | 10/1910 | Alexander | 35/75 |
| 1,165,058 | 12/1915 | Behan | 35/31 E X |
| 1,188,490 | 6/1916 | Robertson | 35/31 C X |
| 1,372,087 | 3/1921 | Roddy | 35/33 |
| 3,147,556 | 9/1964 | Prusmack | 35/31 E |
| 3,690,019 | 9/1972 | Fernandez | 35/31 R |

FOREIGN PATENT DOCUMENTS

| | | | |
|---|---|---|---|
| 340146 | 9/1921 | Fed. Rep. of Germany | 35/32 |
| 829517 | 1/1952 | Fed. Rep. of Germany | 35/32 |
| 632330 | 11/1949 | United Kingdom | 35/31 R |

*Primary Examiner*—William H. Grieb
*Attorney, Agent, or Firm*—Weingarten, Maxham & Schurgin

[57] ABSTRACT

One face of a tablet is divided into a plurality of adjoining regions. The two edge regions at the right and left have rows which in each region are divided into a plurality of fields and are numbered continuously with primarily basic numbers and their multiples, from one edge region continuing into the next. A number of slides, equal to the number of rows in each of the edge regions, lie loosely on the tablet, so that each slide may be pushed along the corresponding two rows which are at the same level of the edge regions in order, as desired, to thereby at least partially cover one or the other of these rows, so that the result of an arithmetic operation carried out in one or the other region can be read from the exposed field adjacent the end of the corresponding slide.

11 Claims, 3 Drawing Figures

TEACHING AID DEVICE FOR TEACHING THE BASIC PRINCIPLES OF ARITHMETIC

BACKGROUND OF THE INVENTION

The invention relates to an aid for teaching the basic concepts of arithmetic. In view of its purpose, this teaching aid is suited primarily for teaching in elementary schools.

In the lowest school levels, in which the pupils are taught the basic concepts of arithmetic, teachers repeatedly experience that the greatest difficulty is in teaching the less gifted pupils the quantity concept which lies hidden in each number. Such pupils only appear to learn the basic concepts, because they acquire the habit of learning by memory the numerical values, or results. The quantity concept is nevertheless entirely absent for them, which is demonstrated by their inability to carry out arithmetic operations with unfamiliar numerical values, because they have not yet memorized these.

Aids for teaching the basic concepts of arithmetic have been known for a long time. The most familiar of these is the abacus. Yet, this clearly can be used only for addition and subtraction. Multiplication and division require a certain quantity concept, or an abstraction, for the balls of the abacus are not identified naturally by numbers. The pupil sees the many balls, but must first count them. In this he can see the quantity itself, but not the particular number which is associated with that quantity. The abacus uses primarily the quantity concept, and to a lesser degree the numerical concept associated with it.

Also known are learning toys. In principle, these have two levers. One end of each is movable along a scale. The other end of each is connected together and to a pointer mechanism. The individual adjustment of both levers along the scale results in a repositioning and pivoting of the pointer, which moves over an interchangeable plate. The plate is provided with numerical values positioned so that the pointer always indicates the numerical result which follows from operating on the chosen numerical values of the scale with the chosen operator. For example, if both the levers are set on the scale to the values 3 and 6, then the pointer will take a particular position. On an addition plate it will indicate the value 9, and on a multiplication plate the value 18. Here the numerical concept is relatively clear. However, because of the relatively complicated movement and pivoting of the pointer, the numbers on the two plates must be placed in an unfamiliar order, the logic of which is at first not entirely clear, even to adults. For the children there does not seem to be any relationship between the numerical result of the arithmetic operation and the other numbers. This difficulty is augmented by the appearance on the multiplication plate of only those values which result from multiplying by a whole unit, a number less than ten. Intervening numbers are left out for reasons of space, which makes it more difficult for pupils to grasp numerical concept for the particular setting. In this way, the pupils are given essentially only an abstract numerical concept, and not the quantitative concept associated with it.

An object of the invention is to provide a handy, readily portable teaching aid for learning the basic concepts of arithmetic which in a clear way associates the numerical values with the corresponding quantitative concept, which without interchangeable parts also introduces the four basic concepts of arithmetic (addition, subtraction, multiplication, and division), and which gives the results of the particular operation to the pupil in an elementary logical arrangement with respect to the other numerical values which is natural and readily grasped by the pupil.

SUMMARY OF THE INVENTION

A novel teaching aid device in accordance with the present invention has a tablet which is divided into a plurality of adjoining regions. Two edge regions have fields which in each region are divided into a plurality of rows and are numbered continuously with primarily basic numbers and their multiples, from one edge region continuing into the next. A number of slides, equal to the number of rows in each of the edge regions, lie loosely on the tablet, so that each slide may be pushed along the corresponding two rows which are at the same level of the edge regions in order, as desired, to thereby at least partially cover one or the other of these rows, so that the result of an arithmetic operation carried out in one or the other region can be read from the exposed field ajacent the end of the corresponding slide.

An embodiment of the teaching aid in accordance with the present invention is illustrated in the accompanying drawings, which show:

DESCRIPTION OF THE PREFERRED EMBODIMENT

Figure 1:
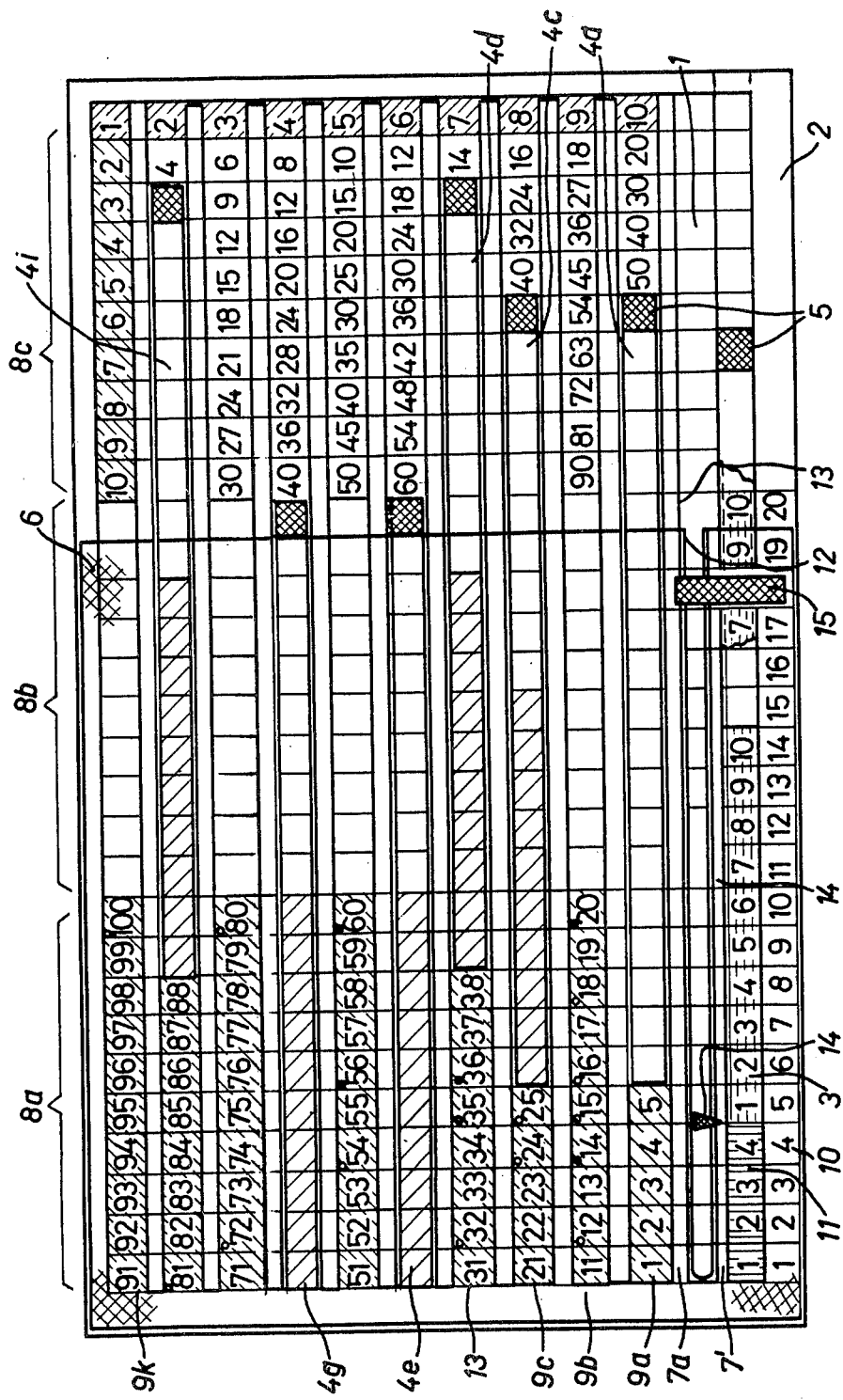
FIG. 1 is a plan view of a teaching aid device in accordance with a preferred embodiment of the present invention and without the individual slides.
Figure 2:
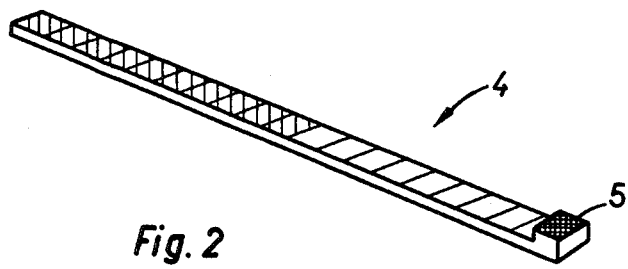
FIG. 2 is a perspective view of a slide for the device of FIG. 1.

FIG. 1 shows the teaching aid device as a whole. It features a tablet 1 with a frame 2 running about the entire perimeter. The tablet 1 is provided with a large number of fields. Loosely lying in these fields on the tablet are a first addition slide 3 and a further 10 slides 4a–4k, which for purposes of illustration of single arithmetic operations are here shown in various differing positions. In order to show the field divisions, only the pushers 4a, 4c, 4d and 4e, 4g and 4i are shown. The pushers 4b, 4f, and 4k are left out. At the right end of each slide 4 is a raised portion 5 which serves as a holding button for sliding the particular slide 4. The slides 4 have a length which is essentially only two thirds the width of the tablet 1 within the frame 2. When the slides are slid all the way to the left (such as, for example the slides 4e and 4g), their raised portions 5 bump against the right edge of a transparent plate 6 which covers the central and the entire left portion of the table 1. This plate 6 is shown at three of its corners by an irregular criss-cross line pattern. The transparent plate 6 is not necessary if the guides 7 and the slides 4 are guided in a dovetail groove or a similar arrangement which will prevent them from falling out.

The slides 4 slide between guide members 7, which extend across the entire width of the tablet 1. They are guided with suitable clearance on the tablet, in dovetail grooves, or in guide grooves.

The tablet 1 is divided into three adjoining regions 8a–8c. The two side edge regions 8a and 8c have white fields which are each divided vertically into ten stacked horizontal rows 9a-9k. The rows are separated from each other by the width of one guide member 7 to provide visual separation. In the region 8a the fields are numbered consecutively from 1-100, beginning in the vicinity of the lower left corner of the tablet. In the region 8c the numbering begins at the upper right corner of the tablet. Starting in both directions from this corner, there are entered the basic numbers 1-9 and their products through multiplication. As may be seen from FIG. 1, a portion of the numbers of both regions is covered by the slides 4.

At the lower left portion of the frame 2 is an addition scale 10 which has numbers from 1 to 20 and which serves for the learning of the very first basic concepts of addition and subtraction. A further scale 11 is found next to it, but just inside of the frame 2 and on the tablet 1. As can be seen in part, it has two series of fields following each other, each numbered from 1-10 (the addition slide 3, which partially covers this scale 11, is shown with a major fragment removed to better show the scale 11).

It is advantageous for the width of the slide 3, or those of the slides 4, to correspond to the height of a field row. If one chooses the width and the height to each be one cm, then it also becomes possible to later introduce basic concepts of geometry. For this purpose, all of the slides 4 and the guides 7 can also be subdivided into individual fields, to simplify the positioning of the slides. Only the slide 3 in FIG. 1 has no such field divisions on its right-hand half. The field divisions can nevertheless be entirely omitted on the guides 7, or partially omitted as illustrated (in the middle field 8b).

To make the arithmetic operations even more clear, the various rows are presented in different colors, which in FIG. 1 is indicated by the different crosshatchings. For example, the fields with hatching slanting to the right are violet or red, those with hatching slanting to the left are green (the slides 4 also are this color on their left half), the fields with vertical hatching are blue, and that portion of the addition slide 3 with horizontal hatching and with the numbers 1-10 is yellow. The colors may, of course, be chosen as desired. The holding tabs 5 of the slides 4 are preferably black (here indicated by cross-hatching, not to be confused with the irregular crosshatching for indicating the transparent plate 6). They may also have other, more clearly visible colors.

The central region 8b, which contains only a portion of the scale 11, can in principle be omitted to shorten the tablet. The advantage of this region, however, lies in that the addition region is thereby completely separated from the multiplication region of the tablet. Otherwise, the scale 11 would lie in part in the region 8c, which could be a source of confusion. Besides, the regions 8a, 8b, and 8c can also, in accordance with the order of their size, be represented as hundred fields, in order to introduce the pupils to a clear quantitative concept of the values 100, 200, etc.

In the transparent plate 6 there is further arranged parallel to the addition slide 3 a slot 12 which covers a guide slot 13 directly below it formed by the two guide members 7' and 7a. In this guide slot 13 are two marking buttons 14, 15, also referenced as runners, which are slidably engaged in a known manner. Each of these runners 14, 15 may be individually moved across the entire width of the tablet 1 and also over the transparent plate 6 as far it extends.

Now the use of the teaching aid will be briefly described.

Ordinarily, the pupils are at first taught the basic concepts of addition and subtraction of simpler numbers, for which the result is at the most 10. For this the addition slide 3 as well as the scales 10 and 11 are used. The runner 14, which, as shown in FIG. 1, slides in the guide slot 13, is for example, positioned at one edge between the fields with the numerals 4 and 5. Then the addition slide 3 is pushed to the right so far that its left edge lies exactly under the runner 14, so that as in the illustrated example the number 4 still lies exposed on the scale 11. The result of the simple addition (4+1 to 4+6) may now without any difficulty be read from the edge scale 10. Once the pupil has grasped this, the addition can be progressed up to 20. For example, in FIG. 1 the addition 4+7 is illustrated with the aid of the second runner 14. If, however, the first step beyond the numerical value 10 proves difficult, then the addition slide 3 can be pulled out to the right over the plate edge, so that the whole scale 11 is exposed, its fields being numbered from 1 to 10 and then continuing on again 1 to 10, as was previously described. One can then teach the pupil, for example, that the addition 9+8 can be combined as an addition of 9+1, which gives the value 10, and an addition 10+7. As can be seen from FIG. 1, the value 17 can be read on the edge scale 10 under this second number 7 on the scale 11. The runner 15 can be appropriately slid to locate this value.

It is self-evident how subtraction may be described in this way.

Figure 3:
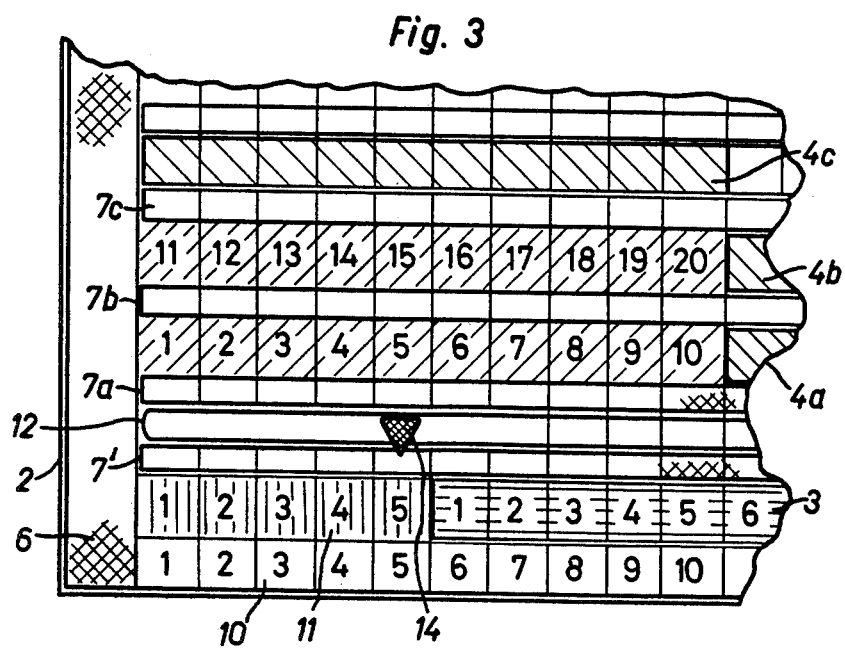
FIG. 3 is an exaggerated plan view of a left, lower corner fragment of a device of FIG. 1.

The next step is the expansion of the number concept to beyond the value 20. How this can be taught the pupils is shown in FIG. 3. If, for example, the number 20 is to be represented, the slides 4a and 4b are slid all the way to the right. The field adjacent the end of the slide 4b now shows the desired value. From this presentation it is particularly clear how the numerical concept can be combined with the quantitative concept. The pupils see that the desired number can be represented by two rows, each of which has ten fields.

For representing the number 25, it is advantageous to first use the addition slide 3, which is positioned so that the value 5 appears on the scale 11, next to the slide 3, so that the pupils see that the number 5 must be added to the previously mentioned number 20. Advanced pupils can then check on the correctness of this slide position by moving the slide 4c so far to the right that the number 25 is exposed (see also FIG. 1).

The description of multiplication and division follows from FIG. 1. As was mentioned, a row of numbers 1-9 is arranged horizontally, and a second, identical row is arranged vertically, the two differing only in color. Which row is to serve as multiplier, and which as multiplicand, is umimportant. Here pedagogical points of view can be considered. If, for example, the multiplication 7×2 is to be carried out, then the slide 4d, which belongs at the number 7 in the vertical row, is moved until its right edge is below the dividing line between the horizontally arranged numbers 2 and 3. The number 14 can be read at the right of the slide. One or more of the slides lying above it can also be moved equally far (in FIG. 1 only the slide 4i), so that the pupil can readily place the slide 4d at the right location, and not perhaps at an adjoining field. Further multiplication examples are apparent from FIG. 1 (2×2, 5×8).

A great advantage of the present teaching aid lies in that now the pupil can see the obtained number product (the intervening numbers are missing in the region 8c) in the numbers of the region 8a, and therewith obtain a good quantitative conception of how the obtained product of two individual numbers fits into the remaining numbers from 1–100. In reverse, it can be checked in the region 8a whether the pupils are capable of recognizing particular numbers as products of two simpler numbers and of asking themselves which two, or in some cases three (such as for the number 36) factors are used to obtain the number. For this purpose, those numbers which are products, and thereby correspond to the numbers in the region 8c, are marked with a circle in the fields of the region 8a (see for instance the numbers 35 and 36).

The present teaching aid permits, after the working of the arithmetic operation, the independent checking of the solved problem by the pupil alone, and thereby an instant individual verification of his ability. The pupil thereby attains an essentially greater depth of the learning process, i.e. the pupil's own thinking is set into play in working with the number concepts and quantity concepts.

From this embodiment, which only points out a few of the pedagogical possibilities, it can be seen that the teaching material in accordance with the present invention makes possible a particularly clear representation of the numbers and their arrangement in the number system and gives the pupils a good understanding of the quantity concept of each individual number.

I claim:

1. A device for teaching the basic concepts of arithmetic, comprising:
   a tablet having two faces;
   a plurality of adjoining regions defined on one of said faces;
   a plurality of fields defined within each of two edge regions located most remotely on opposite sides of said one face;
   a plurality of regular rows composed of said fields defined within each of said edge regions;
   a first set of consecutive numbers displayed in said rows of one of said edge regions, said first set of numbers being arranged to permit selective demonstration of addition and subtraction and the sequential position thereof;
   a second set of numbers displayed in said rows in the other of said edge regions, said second set of numbers being arranged to indicate a product of one number selected from a first array of numbers and of another number selected from a second array of numbers;
   a plurality of guide members, each of said guide members being disposed between adjacent ones of said rows;
   a plurality of slides, each of said slides being associated with one of said rows, each of said slides being loosely guided on said face between two of said guide members disposed on either side of an associated row, and each of said slides being slidable along an associated row between a first section thereof in said one of said edge regions and a second section thereof disposed at the same level as said first section in said other of said edge regions, at least a portion of one or the other of said first section or said second section being covered by an associated one of said slides to expose at a corresponding end of said associated one of said slides a result of an arithmetic operation carried out in one or the other of said edge regions.

2. The device of claim 1, further comprising a central region disposed on said face between said edge regions and having the same size as said edge regions.

3. The device of claim 2, further comprising:
   a first scale under said rows in said one of said edge regions, said scale having two series of ten consecutively numbered fields each;
   a special slide for covering said fields of said first scale, said slide extending into said center region;
   a frame around said tablet; and
   a second scale disposed on said frame adjacent to, and parallel to said first scale, said second scale having the same length as said first scale and having fields numbered consecutively thereon.

4. The device of claim 3 wherein the width of each of said slides is equal to the height of each of said rows.

5. The device of claim 1 wherein the width of each of said slides is equal to the height of each of said rows.

6. The device of claim 3 wherein said slides have a length equal to twice the width of each of said regions.

7. The device of claim 6 wherein a portion of said guide members is arranged between said rows to separate one row from another, said guide members extending the entire width of said tablet, and said guide members providing a border between the lowermost of said rows and said first scale.

8. The device of claim 7 wherein two of said guide members form a guide groove for guiding a marking button along the entire width of said tablet.

9. The device of claim 8 wherein a transparent plate covers at least two of said regions and has a slot located over a portion of said guide groove.

10. The device of claim 1 wherein at least some individual ones of said fields of said one edge region and of said other edge region are set off from others of said fields by being differently colored.

11. The device of claim 5 wherein said slides and said guide members have graphical divisions corresponding to the rows with which they are associated, said divisions making it easier to position said slides.

* * * * *